(12) United States Patent
Krecke

(10) Patent No.: US 6,220,339 B1
(45) Date of Patent: Apr. 24, 2001

(54) ENERGY SYSTEM FOR BUILDINGS

(76) Inventor: Edmond D. Krecke, 15-17 route de Grundhof, L-6315 Beaufort (LU)

( * ) Notice: Subject to any disclaimer, the term of this patent is extended or adjusted under 35 U.S.C. 154(b) by 0 days.

(21) Appl. No.: 09/029,696

(22) PCT Filed: Sep. 12, 1996

(86) PCT No.: PCT/EP96/04009

§ 371 Date: Mar. 30, 1998

§ 102(e) Date: Mar. 30, 1998

(87) PCT Pub. No.: WO97/10474

PCT Pub. Date: Mar. 20, 1997

(30) Foreign Application Priority Data

Sep. 12, 1995 (DE) ............................................. 195 33 475

(51) Int. Cl.[7] .............................. F25B 29/00; F24J 2/40; F24J 2/34; E04D 13/18
(52) U.S. Cl. ......................... 165/48.2; 126/585; 126/620; 126/621; 126/633
(58) Field of Search .......................... 165/48.2; 126/583, 126/585, 587, 617, 621, 628, 633, 634, 620, 597

(56) References Cited

U.S. PATENT DOCUMENTS

| | | | |
|---|---|---|---|
| 2,342,211 | * 2/1944 | Newton | 126/585 |
| 3,262,493 | * 7/1966 | Hervey | 126/620 |
| 4,000,851 | * 1/1977 | Heilemann | 126/633 |
| 4,129,177 | * 12/1978 | Adcock | 126/628 |
| 4,184,477 | * 1/1980 | Yuan | 126/620 |
| 4,248,209 | * 2/1981 | Wasserman | 126/620 |
| 4,279,241 | * 7/1981 | Himes | 126/633 |
| 4,327,705 | * 5/1982 | Steutermann | 126/585 |
| 4,408,596 | * 10/1983 | Worf | 126/633 |
| 4,444,177 | * 4/1984 | Kirchmayer | 126/585 |
| 5,954,046 | * 9/1999 | Wegler | 126/617 |

* cited by examiner

*Primary Examiner*—Ira S. Lazarus
*Assistant Examiner*—Tho Duong (57) ABSTRACT

An energy system for buildings uses solar absorbers, heat exchangers and heat accumulators, and has the following features to improve the thermal balance of the building: the solar absorber has tubes or pipes laid to form meanders between the roofing and an insulating layer arranged thereunder; the solar absorber is subdivided into at least two zones each with its own liquid circulation system; there is arranged below the building a solid heat-accumulator to which heat can be supplied or removed using embedded tubes or pipes; the heat accumulator is subdivided into at least two zones, i.e., a central zone and an outer zone each with its own liquid circulation system; during operation of the heat accumulator, liquid is supplied by way of thermally controlled valves from the liquid circulation system of each zone of the solar absorber firstly to the liquid circulation system of the central heat accumulator zone and, secondly to the liquid circulation system of the outer heat accumulation zone, when the temperature of the liquid in the circulation system of the respective zone is greater at least by one value ranging from 2 to 8° C., preferably 2° C., than the temperature of the respective solid accumulator zone; and during heat removal, liquid is pumped into a heating system of the building by thermally controlled valves, firstly from the liquid circulation system of the outer heat accumulator zone and, secondly, from the liquid circulation system of the central heat accumulator zone.

16 Claims, 5 Drawing Sheets

ENERGY SYSTEM FOR BUILDINGS

CROSS-REFERENCE TO RELATED APPLICATION

Not applicable

STATEMENT REGARDING FEDERALLY SPONSORED RESEARCH OR DEVELOPMENT

Not applicable

BACKGROUND OF THE INVENTION

Field of the Invention

The invention relates to an energy system for buildings according to the preamble of claim 1.

Solar energy systems have been known for a long time and are increasingly used for energy saving. In particular, the heat produced by direct solar irradiation is used in solar absorbers for the heating or preheating of service water, and also in heating systems. It is also already known to first store the heat energy which is not immediately required, for example by heating water in a tank. The heat energy can later be extracted from the accumulator by means of heat exchangers.

Heat insulation also plays an important part in the energy balance of a building, in addition to the energy supply in the form of solar energy or combustion energy. Important advances have been made here by heat insulating materials in the region of the outer walls and of the roof. However, further improvements of the heat balance are desirable, and the invention therefore has as its object to make such improvements possible. The attainment of the object is characterized in claim 1. In common with other features which are described in more detail hereinbelow, it is based on physical fundamentals.

The solar absorber according to feature (a) is substantially more cost-effective than known solar absorbers, which are installed additionally on the roof in the form of plates. By the laying of tubes or pipes between the roof covering, which generally consists of roofing tiles, and the insulating layer, no additional constructional materials are required other than the tubes or pipes. Furthermore, the external appearance of the building is not detracted from.

The division of the solar absorber according to feature (b) into at least two regions, each with its own liquid circuit, insures that the liquids heated in the absorber can be used separately according to their respective temperatures, instead of producing an average, mixed temperature at the output of the solar absorber. For example, the liquid with the higher temperature can also then further boost a heat accumulator, even when the average mixed temperature is below the temperature of the heat accumulator.

The solid heat accumulator according to feature (c) is likewise divided into at least two regions. The central region then has the higher temperature. The regions with lower temperature can then also be further loaded by means of absorber liquids when their temperature is lower than that of the central region. A very good energy balance can thereby be attained. The feature (e) describes more precisely the operation controlled by temperature sensors. Correspondingly, the feature (f) describes more precisely the operation by means of which heat energy is extracted from the accumulator regions for heating the building.

Further developments of the invention are the subject of the dependent claims. Thus it can be provided that the solar absorber is divided into at least three regions, which are associated with differently oriented roof sections. This enables an even better separation between the different temperature regions to be achieved, in dependence on the geographical orientation of the roof sections. The tubes or pipes of the solar absorber can suitably be laid in troughs or grooves of meandering form in the insulating layer. They are then securely mounted without additionally increasing the thickness of the insulating layer or of the roof covering.

In an advantageous manner, the outer region of the solid heat accumulator is widened out downward in the shape of a funnel, and the sections which are located outside the contour of the building are covered by a heat-insulating layer. In this manner, the heat rising from the Earth's interior can be used to a greater extent. Even in winter, with temperatures below the freezing point, the ground is substantially warmer because of the rising energy. For example, an average temperature at a depth of 2 m, with a free surface, is about +7 to +9° C. Under the building, the temperature at this depth amounts to at least about +14 to +16° C. The same effect for the use of the Earth's heat results, for example, from covering with plantings, which prevent the Earth's rising heat from immediately radiating away again. Frost protection can be achieved in this manner.

The solid heat accumulator can advantageously be divided into three regions, namely the central region, a middle region surrounding the central region, and an outer region surrounding the middle region. An even finer graduation of the temperature levels of the individual accumulator regions can thereby be attained.

The outer region of the solid heat accumulator can furthermore be surrounded by a peripheral accumulator region. The recovery of further heat energy can thereby be made possible. In particular, however, the peripheral accumulator can also be used to obtain cooling in the building by means of the cold liquid.

By means of the different accumulator regions, with respectively lower temperatures, which surround the central region in a shell shape but are as far as possible open downward, the result is achieved that the central region is better insulated and loses less heat, because the surrounding middle region is less cold than the ground. The corresponding relationship also holds for the outer accumulator region. The lateral heat outflow of the accumulator is largely compensated by the funnel-shaped configuration of the outer accumulator region. Moreover, even the smallest solar heat with a lower temperature can still be used by the division of the accumulator into several regions, in that the liquid from the solar absorber regions is conducted into the outer or peripheral region of the solid accumulator. In this manner, even in winter at absorber temperatures between 8° C. and 15° C., the solar energy can be used by loading the peripheral accumulator region. The "protective jacket" around the central accumulator region is improved by heating in this manner. Altogether, it is thereby possible to bridge over the dreaded energy hole in the months of December through March in the conventional solar heating technology.

At least a portion, or all, of the outer walls appropriately each has a tube or pipe system through which liquid flows in order to transfer heat from the wall to the liquid or vice versa, wherein the tube or pipe system can be connected in a circuit with a pump for the liquid. In this manner, a heat exchange can take place between the outer walls on the sun side and the shade side. Such a "north-south equalization" can substantially improve the heat economy of the building when heat from the hot south wall is delivered to the cold north wall in summer. This leads in winter also to a more uniform heat distribution in the building. The outer walls of the building can appropriately be additionally provided on the outside with a transparent, absorption-increasing coating or facing, in order to obtain a better energy yield. Such a transparent heat insulation is also denoted by "TWD".

A further development of the invention provides for the tube or pipe system of the outer walls of the building to be connected via temperature-controlled valves to the liquid circuits of the regions of the solid heat accumulator. Then in summer the energy radiated in can be stored, and furthermore cool liquid, in particular from the peripheral accumulator, can be supplied for the cooling of the tube or pipe systems in the outer walls. In winter, the pipe systems of the outer walls of the building are advantageously used as a heating system. Moreover, additional heat energy can be recovered in winter, particularly in the case of a coating or facing with absorption-increasing material (TWD).

The tube or pipe systems in the outer walls of the building make possible numerous air conditioning processes and compensation functions and are therefore also termed an "outer wall air conditioning and compensation system" (AKK system). There belong to the functions the north-south equalization already mentioned, air conditioning in the summer months by taking away excess solar heat, a compensation for heat transmission losses in the winter months by space heating by means of stored energy, and also the function as a wall heating system. A ring conduit can suitably be laid for this purpose in a solid floor, and branch ducts can lead from it to the outer walls of the individual spaces. Thermostatic valves in these branch ducts permit individual temperature regulation of each individual space. A large-surface heating of this kind was already known in Roman times as hypocaust heating, and served for the heating of villas and baths. The temperature adjustment of historic protected buildings, with thermal drying of masonry at the same time, is also made possible by such a system. Solid accumulators may then usually be installed in the cellars of such buildings. Solar absorbers can be retrofitted during roof repairs without externally detracting from the appearance of the building. If necessary, solar absorbers can also be placed outside the building, or if necessary one can manage without the absorber.

The AKK system can also prevent dew point problems in endangered regions of structural members, by maintaining dryness, and by condensation protection in regions exposed to high humidity or in regions in contact with the ground. Finally, a low power (few kW) emergency and additional heating system can be connected to the circuits of the AKK system, for extreme weather conditions, or even for habits of use which lack energy discipline and which cannot be calculated.

A service water heat exchanger can be connected by means of temperature controlled valves, as a bypass and with priority, to that region of the solar absorber which has the highest temperature. A heating or preheating of the service water to more than 40° C. can be obtained in this manner. The solid heat accumulator appropriately contains as accumulator material a packing of broken stone or gravel, at least 60 cm thick, because of its low cost and high specific heat. In addition, in the central region of the solid heat accumulator, a layer can be formed of steel beams, auto cubes (old autos compressed into cubes), and similar material with the highest possible specific heat. Disposal of such materials is thus effected at the same time, and may even be paid for.

The heat accumulator as a whole, or particularly its central region, can be insulated on the ground side by a heat insulating layer. An energy loss from the regions of the heat accumulator which have a higher temperature than the ground below them is thereby hindered. In the outer region, and particularly in the peripheral region, heat insulation may on the contrary be inappropriate, when the heat rising from the Earth's interior arrives with a higher temperature than that of the respective accumulator region. Water or an antifreeze agent of the usual kind is used as the liquid for all the circuits.

Circulation pumps may possibly be necessary in the individual regions of the solar absorber, of the solid heat accumulator, and of the building heating system which is appropriately designed as floor heating or outer wall heating; the circulation pumps are not described in detail here, since a skilled artisan can judge without difficulty their respective use in each individual case.

Modern buildings are so well sealed that periodic ventilation is indispensable. However, this leads to heat losses, or to an undesired additional heat inflow in summer. A development of the invention proposes that openings for air interchange are provided, particularly in the window frames, and heat exchangers in them are connected to the tube or pipe systems of the building outer walls and have fins through which the liquid flows. The air flowing in winter can then be preheated by the heat exchangers, with recovery of the heat, and in summer a corresponding cooling of the inflowing air can be obtained.

Another solution of the ventilation problem proposes that an outer ground duct arranged around the peripheral heat accumulator region and an inner intake channel running in the solid heat accumulator are provided. Controlled by a multi-way valve, cooled air can be sucked in through the outer duct in summer operation, and in winter operation preheated air can be sucked in through the inner duct and conducted into the building.

Embodiment examples are described hereinbelow with reference to the accompanying drawings.

Figure 1:
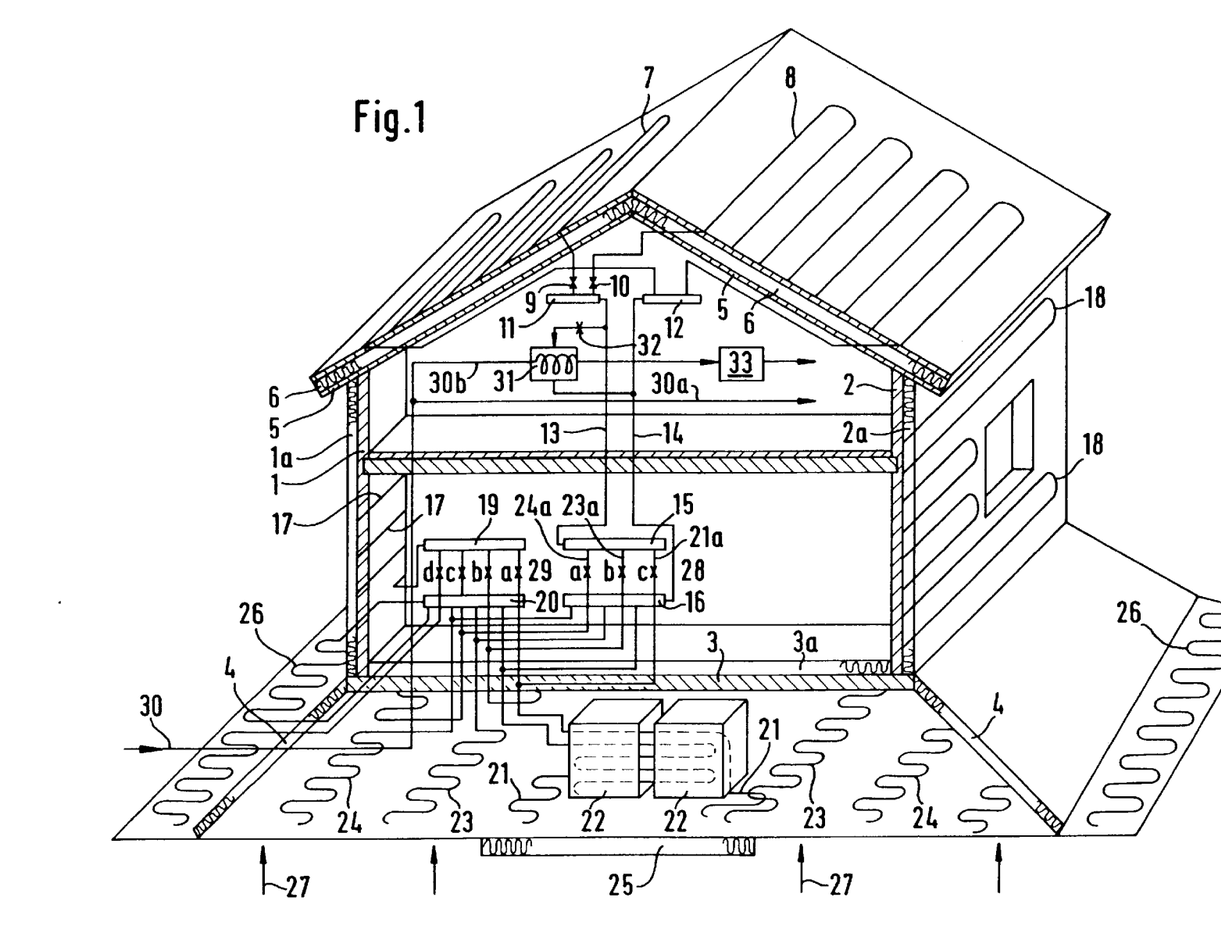
FIG. 1 shows schematically a building with the various systems and devices according to the invention.

The outer walls 1, 2 of the house, in a concrete formwork construction, are provided with an insulating layer 1*a*, 2*a* which has, for example, a thickness of at least 25 cm and consists of hard polystyrene foam. The bottom slab 3 of the house is likewise cast from concrete and is provided with an insulating layer 3*a*. The heat insulating layer 4 extends from the bottom slab and the outer walls 1, 2. Such insulating layers 4 are only shown in the drawing on the two sides shown with the outer walls 1, 2. The front and back walls of the house are however of a similar structure.

The oblique heat insulating layers 4 form, together with the bottom slab 3, a space for a solid heat accumulator, which contains, for example, a crushed stone or gravel bed (not shown in detail) with additional accumulator bodies, as will later be described more exactly.

The roof of the house contains, on the usual substructure 5 of wooden rafters and possibly planks, a heat insulating layer 6 with a thickness of about 18 cm and made of the same material as the heat insulating layers 1a, 2a of the outer walls 1, 2. Meandering pipe ducts 7, 8 (polypropylene pipes, 20×2) are laid on the upper side of the heat insulating layer, in troughs or grooves of the insulating layer 6, beneath the roof covering (not shown) which is in the form of roof tiles, as black as possible. The pipe ducts 7, 8 form separate liquid circuits on the two sides of the house which are shown, and are connected via temperature controlled valves 9, 10 to common collectors 11, 12 for the hot or cold side of the pipe duct systems. For simplification, the valves 9, 10 are shown here, as are all other valves, as a cross on the respective duct. Pipe ducts 13, 14 lead from the collectors 11, 12 to further collectors 15, 16, which can also be integrated with the collectors 11, 12 to form a unit.

For as complete as possible a use of the solar energy, the circuits of the individual solar regions can also, as an alternative (not shown), be supplied individually to such collectors in the form of short pipe pieces. The circuits then open, for example, at the end walls of the collectors, so that the liquid permanently circulates, or is pumped around, in the circuit. Two pipes or tubes lead from the periphery of the collectors near the ends, to the further collectors 15, 16, a temperature controlled valve being inserted in one of the pipes. After the opening of the respective valve, the liquid can then (in large part) be supplied to the appropriate accumulator region.

Figure 2:
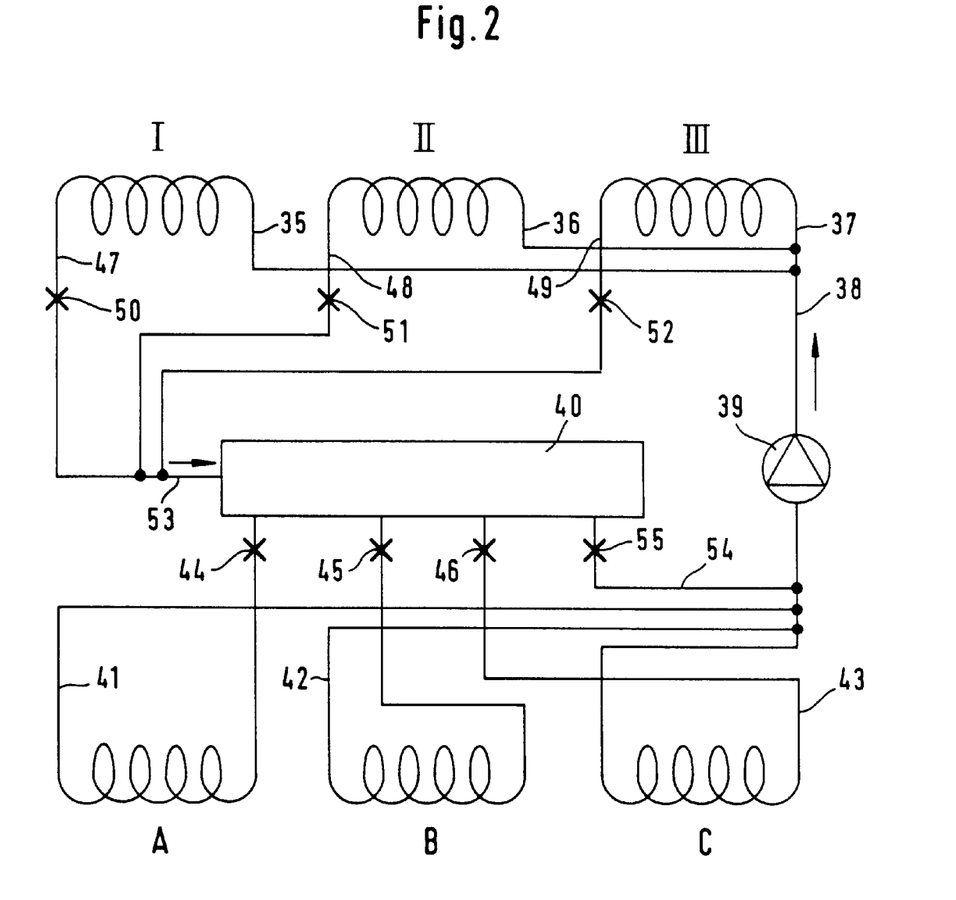
FIG. 2 shows a modification of the embodiment example according to FIG. 1.

FIG. 2 shows a further alternative for the connections between the solar absorber regions I, II and III. For example, the regions I and II can then correspond to the pipe ducts 7, 8 according to FIG. 1. The region III is additionally present. The supply pipes 35, 36, 37 of the regions I, II, or III are united to a common duct 38 and lead via a circulating pump 39 on the one hand to a collector 40 and furthermore to the return ducts 41, 42, 43 of the central solid heat accumulator C, which corresponds to the circuit 21 in FIG. 1, and also to the sections A, B, which correspond to the circuits 24 or 23 in FIG. 1. The supply pipes of the accumulator regions A, B, C are connected to the collector via temperature controlled valves 44, 45 or 46. For completion of the circuits, the return pipes 47, 48 and 49 of the absorber regions I, II and III are connected via temperature controlled valves 50, 51 and 52 to the common duct 53, which leads into the collector 40. Furthermore, a duct 54 is present between the input of the pump 39 and the collector 40. This duct contains a further temperature controlled valve 55.

The temperature controlled valves 50, 51 and 52 are appropriately valves which are controlled by means of temperature sensors and relays. In contrast to this, thermostatic valves which appropriately are manually settable are used for the valves 44, 45, 46.

For the explanation of different operating states, let it be assumed, for example, that the solid heat accumulator regions have the following temperatures:

| | |
|---|---|
| Outer accumulator region | A = +16° C. to 24° C. |
| Middle accumulator region | B = +25° C. to 34° C. |
| Central accumulator region | C = +35° C. and higher. |

An outer air intake channel 60 passes around the building. An inner air intake channel 62 preferably lies within the outlines of the outer air intake channel 60. Connected to the outer air intake channel 60 and the inner air intake channel 62 is a multi-way valve 70, preferably provided in the building. By means of this multi-way valve 70 in connection with the outer and inner air intake channels 60, 62 air exchanges between the outside and the inside of the building is achieved.

The peripheral accumulator region has a temperature between +7° C. and +15° C.

EXAMPLE 1

| | |
|---|---|
| External temperature | −4° C. |
| Roof absorber regions: | maximum +26° C. |

The valves 50, 51, 52, 55 remain closed; the pump 39 is switched off. Thus no heat can be delivered to the solid heat accumulator with the regions A, B, C, since the maximum temperature of the liquid of the solar absorber regions still lies below the temperature of the solid heat accumulator region A with the lowest temperature.

EXAMPLE 2

| | |
|---|---|
| External temperature | +6° C. |
| Solar absorber region I: | +26° C. |
| Solar absorber regions II and III: | +12° C. |

The valves 44, 45, 46, 55 are opened; the pump 39 is switched on. The valve 44 opens when the temperature of the accumulator region A is at least 2° C. below the temperature of the liquid in the collector 40.

EXAMPLE 3

| | |
|---|---|
| External temperature | +36° C. |
| Temperature of the roof absorber regions I, II, III: | +64° C. to +75° C. |

The valves 50, 51, 52, and 55, and also the valve 46 which leads to the central accumulator C, are opened. The central accumulator region C is then boosted with the relatively high temperature of the liquid from the solar absorber.

In winter operation there furthermore exists the possibility of opening the valves 50, 51, 52 and 55 by means of relay circuits, but only for short times at intervals.

Further pipe duct systems 17 or 18 are laid in meandering form in the outer walls 1, 2, and are connected to collectors 19, 20. These connections are shown only for the pipe duct system 17. However, the pipe duct system 18 leads to the collectors 19, 20 in a similar manner. There is thus the possibility of a north-south heat exchange by pumping the hotter liquid at the one side around to the colder liquid at the other side, and vice versa. Furthermore, as mentioned later, hot water from the pipe duct systems 17, 18 can be supplied from the pipe duct systems 17, 18 to the solid accumulator, or cold water for cooling can be pumped into the pipe systems 17, 18.

The solid accumulator is divided into a total of four regions with different temperature ranges. The central region, which is defined by meandering pipe ducts 21 imbedded in the material of the solid accumulator and forming a closed circuit, has additional metal packets 22, with a protective layer, in the crushed rock or gravel bed, with the pipe ducts 21 likewise passing through them or around their surfaces. As a result, the central region 21, 22, which has the highest accumulator temperature, also has a raised heat capacity. The imbedding of the pipe ducts appropriately takes place with an intermediate or protective layer (not shown) of concrete or the like material. The solid accumulator has a middle region which is adjacent to the central region and which is defined by a liquid circuit with pipes 23 running in a meandering form, and an outer region which surrounds the middle region 23 and is defined by a liquid circuit with meandering pipes 24. The pipes 23, 24 are imbedded, with a protective layer, in the crushed rock or gravel bed. A heat insulating layer is located beneath the central region 21, 22, and prevents heat losses in a downward direction from the relatively hot, central region 21, 22.

The outer accumulator region 24 is surrounded by a peripheral accumulator region with a liquid system of pipes 26 laid in a meandering form. The peripheral region 26 collects the Earth's heat (geothermal energy), which is symbolized by arrow 27, as do the further regions of the solid accumulator. In particular, the peripheral region 26 can, however, also be used in summer to feed cool liquid to the outer wall pipe systems 17, 18 for cooling of the building.

According to FIG. 1, the distribution of the heated liquid coming from the solar absorbers 7, 8 to the individual accumulator regions takes place by means of the collectors 15, 16. Temperature controlled valves 28a, b, c are respectively arranged in the pipe ducts 21a, 23a, 24a, which feed liquids to the accumulator regions 22 or 23 or 24. When the temperature of the liquid coming from the solar absorber is high, for example, between 25° C. and 35° C., the liquid is then supplied via the valve 28c to the central accumulator with the liquid circuit 21. When the temperature is between 15 and 24° C., for example, the middle/outer accumulator region 23 is loaded. Finally, the hot liquid is supplied to the outer storage region 24 when the temperature is between 7 and 14° C., for example.

Heat can be supplied from the accumulator regions 21, 23, 24, 26 by means of collectors 19, 20 via valves 29a, b, c, d to the outer wall liquid systems 17 and 18 for the heating of the building. The valves 29a, b, c, d are likewise temperature controlled, so that the systems 17, 18 are respectively acted on with a liquid of the required temperature. In summer, there is also the possibility of feeding cold liquid from the accumulator 26 to the systems 17, 18 via the valve 29d.

Drinking water is supplied in the building by means of a duct 30 which feeds the consumer via a branch duct 30a. A further duct 30b leads to a heat exchanger 31 which is only shown schematically. This heat exchanger is supplied in the bypass with hot liquid by means of a temperature controlled valve 32 from the collector 11. The water flowing through can thereby be heated or preheated to a temperature of 38° C., for example. A subsequent boiler or throughflow heater provides for holding a reserve, and possible further heating of the preheated service water. Instead of the heat exchanger 31, ducts (not shown) imbedded in the central accumulator region, in the form of polyethylene pipes, for example, can also be used. The central accumulator region then acts as a heat exchanger.

All the valves shown can be thermostatic valves which can be set manually to the desired temperature, and in fact such that the valves open at the beginning of a settable temperature range, and close again at the end of the range. The possibility also exists, however, of controlling all the valves centrally by means of a computer according to a predetermined program, by means of relays or servomotors. Maximum flexibility is thereby obtained under different weather conditions and weather changes.

Figure 3:
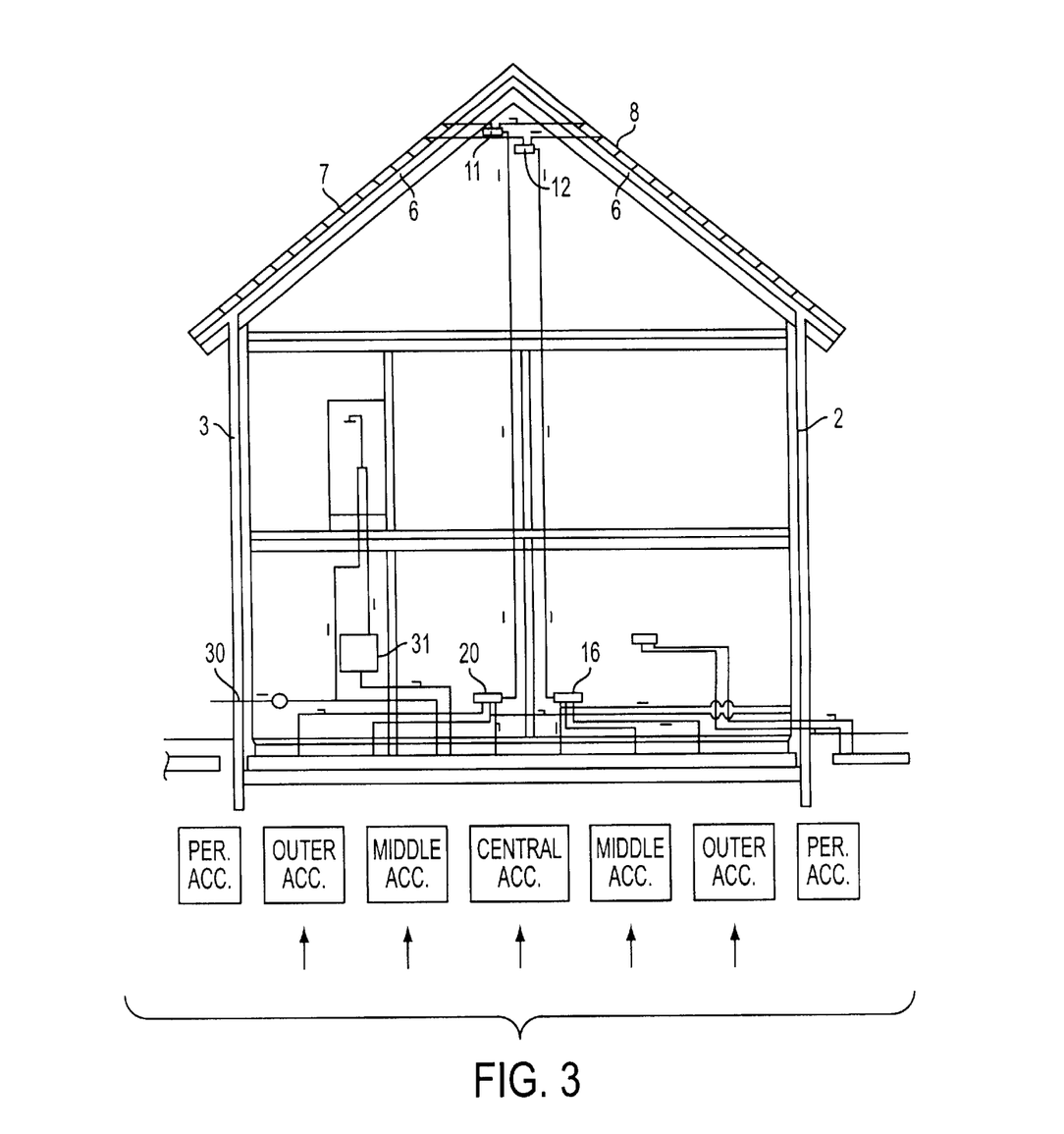
FIG. 3 shows schematically a variant of the building according to FIG. 1.

FIG. 3 shows a section through a building similar to that in FIG. 1. The essential components including the roof absorber, the solid accumulator, the wall circuits, the collectors and the connecting pipe ducts are the same. However, the illustration in FIG. 3 corresponds more exactly to the actual conditions in a building. In particular, it should be noticed that the additional components require only a little space and do not substantially complicate the construction of the building. The solid accumulator is only schematically shown, with the central, middle, outer and peripheral regions. In practice, the central region has a temperature of 38° C. and more, the middle region a temperature between 25 and 34° C., the outer region a temperature between 15 and 24° C., and the peripheral region a temperature between 7 and 14° C.

Figure 4:
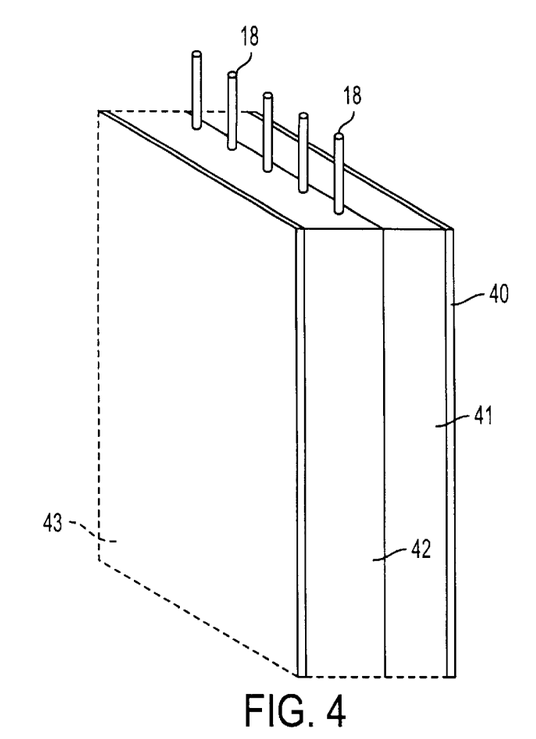
FIG. 4 shows a perspective partial view of a building outer wall with an outer insulating layer.

FIG. 4 shows schematically the construction of an outer wall with an outer plaster layer 40, an outer insulating layer 41 with a thickness of between 10 and 25 cm, a solid wall 42 of, for example, lightweight concrete, and in the interior of the building with a particle board covering 43, which can already be suitable for wallpapering. The pipes or tubes 18 run in the solid wall 42 and make heating or cooling possible, according to the above description.

Figure 5:
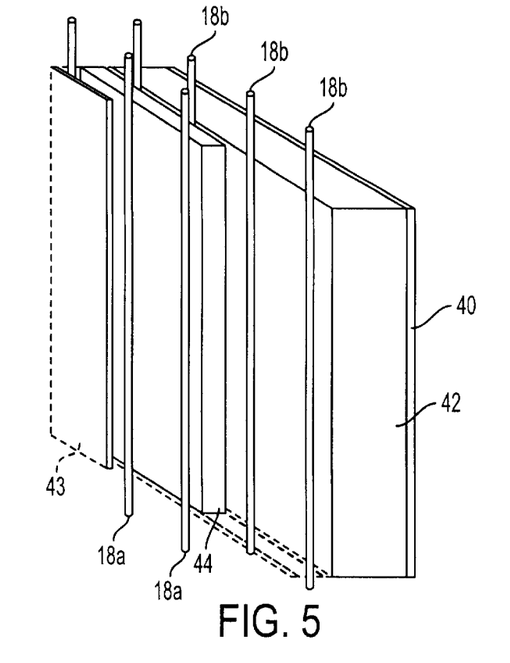
FIG. 5 shows schematically a perspective partial view of a building outer wall with an inner insulating layer.

FIG. 5 shows a wall section of a building, for example a historic, protected building, the exterior facade of which cannot be altered. The existing solid wall has an existing or renewed plaster layer 40. The return pipes 18b of the pipe or tube system 18 are laid on the inner side of the solid wall 42. An insulating layer 44 then results from the filling (not shown) of the interspaces between the pipes 18b, and on it are laid the inlet pipes 18a, offset relative to the return pipes 18b, and possibly in grooves (not shown). An inner wall lining 43 forms a completion. The heating of the internal spaces then takes place by means of the supply pipes 18a as a wall heating, and the return pipes 18b make possible a heating of the outer solid wall 42, such that a thermal drying and maintenance of dryness is made possible.

Figure 6:
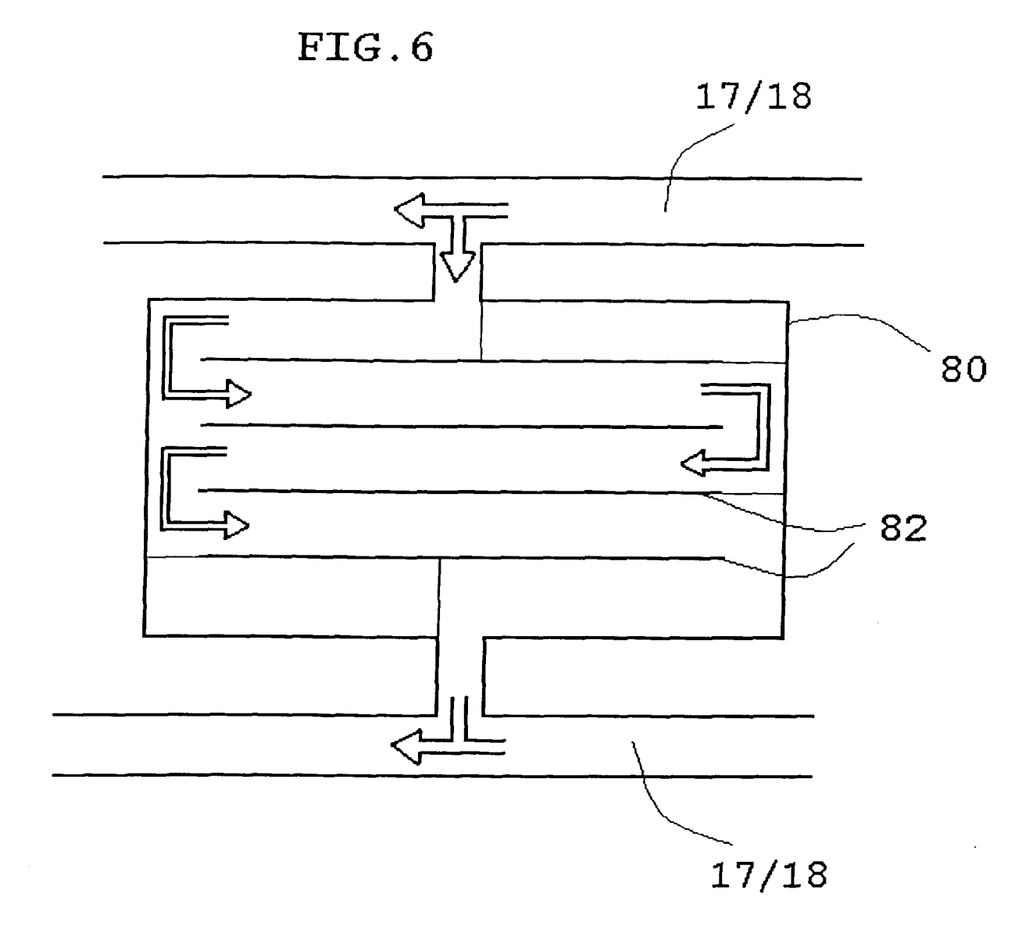
FIG. 6 shows a heat exchanger with fins connected to a first tube or pipe system of outer walls of another embodiment of the invention.

FIG. 6 schematically shows a heat exchanger 80 with fins 82, which is connected to a first tube or pipe system 17, 18. The arrows in FIG. 6 indicate the directions of the airflow. In this drawing air flows from the right side of the tube or pipe 17, 18 to the left side thereof. The air flow essentially passes the heat exchanger 80, as indicated by the three curved arrows; leaving the lower tube or pipe 17, 18 in the left direction.

Captions on FIG. 3 [left to right]

Peripheral accumulator . . . outer accumulator . . . middle accumulator . . . central accumulator . . . middle accumulator . . . outer accumulator . . . peripheral accumulator.

I claim:

1. An energy system for building, comprising:
   (a) a solar absorber having first tubes or pipes (7, 8) that are laid between a roof covering and an insulating layer (6) arranged under said roof covering,
   (b) said solar absorber being divided into at least two regions, each with its own liquid circuit through said first tubes or pipes (7, 8),
   (c) a solid heat accumulator (21, 22, 23, 24, 26) arranged under the building, to which heat can be supplied and from which heat can be withdrawn by second tubes or pipes laid in said solid heat accumulator, characterized in that
said solid heat accumulator is divided into at least two regions, comprising a central region (21, 22) and a middle/outer (23, B; 24) region, each with its own liquid circuit through said second tubes or pipes of that region, in which
in heat accumulation operation, liquid is supplied via first temperature controlled valves (9, 10) from said liquid circuit of each region of said solar absorber primarily to said liquid circuit (21) of said central heat accumulator region and secondarily to said liquid circuit (23, 24) of said middle/outer heat accumulator region, when the temperature of liquid from said liquid circuit of a respective solar absorber region is higher at least by a value in the range of 2–8° C. than the temperature of a respective solid accumulator region (21, 22, 23, 24, 26), and
in that in heat extraction operation, liquid is pumped into a heating system (17, 18) of said building through second temperature controlled valves (29a, b, c), primarily out of said liquid circuit of said middle/outer heat accumulator region (23, 24) and secondarily out of said liquid circuit of said central heat accumulator region (21), and
in that said solid heat accumulator is divided into three heat accumulator regions, including a middle region (23, B) that surrounds said central region (21, C), and an outer region (24, A) that surrounds said middle region (23, B).

2. The energy system according to claim 1, in which said solar absorber is divided into at least three regions that are associated with differently oriented roof sections.

3. The energy system according to claim 1, in which said first tubes or pipes (7, 8) are laid in meandering troughs or grooves of said insulating layer (6).

4. The energy system according to claim 1, in which said outer region (24, A) of said solid heat accumulator is widened downward in a shape of a funnel and, outside a contour of said building, is covered by a heat insulating layer (4).

5. The energy system according to claim 1, in which said outer region (24, A) of said solid heat accumulator is surrounded by a peripheral accumulator region (26).

6. The energy system according to claim 1, in which third tube or pipe systems (17, 18) through which liquid flows are contained in at least a portion of outer walls (1, 2) of said building.

7. The energy system according to claim 6, in which said third tube or pipe system (17, 18) is connected via sixth of temperature controlled valves (29a, b, c, d) to liquid circuits (21, 23, 24, 26) of said solid heat accumulator region.

8. The energy system according to claim 6, in which said building outer walls (1, 2) are provided on an outside with an absorption-increasing, transparent coating (TWD) or facing.

9. The energy system according to claim 1, in which a service water heat exchanger (31) is connected via a seventh temperature controlled valve (32) as a bypass and with priority to a region (7, 8) of said solar absorber that has highest temperature.

10. The energy system according to claim 1, in which said solid heat accumulator contains as accumulator material a crushed rock or gravel packing with a thickness of at least 60 cm.

11. The energy system according to claim 1, in which said solid heat accumulator is insulated on a ground side by a heat insulating layer (25).

12. The energy system according to claim 1, in which water or an antifreeze agent is used as said liquid.

13. The energy system according to claim 11, in which said solid heat accumulator is insulated in said central region (21) of said solid heat accumulator.

14. The energy system according to claim 1, in which said temperature of liquid from said liquid circuit of said respective solar absorber is higher by 4° than the temperature of said respective solid accumulator region.

15. An energy system for buildings, comprising:
(a) a solar absorber having first tubes or pipes (7, 8) that are laid between a roof covering and an insulating layer (6) arranged under said roof covering;
(b) said solar absorber being divided into at least two regions, each with its own liquid circuit through said first tubes or pipes (7, 8);
(c) a solid heat accumulator (21, 22, 23, 24, 26) arranged under the building, to which heat can be supplied and from which heat can be withdrawn by second tubes or pipes laid in said solid heat accumulator,
characterized in that
said solid heat accumulator is divided into at least two regions, comprising a central region (21, 22) and a middle outer (23, B; 24) region, each with its own liquid circuit through said second tubes or pipes of that region, in which in heat accumulation operation, liquid is supplied via first temperature controlled valves (9, 10) from said liquid circuit of each region of said solar absorber primarily to said liquid circuit (21) of said central heat accumulator region and secondarily to said liquid circuit (23, 24) of said middle/outer heat accumulator region, when the temperature of liquid from said liquid circuit of a respective solar absorber region is higher at least by a value in the range of 2–8° C. than the temperature of a respective solid accumulator region (21, 22, 23, 24, 26), and
in that in heat extraction operation, liquid is pumped into a heating system (17, 18) of said building through second temperature controlled valves (29a, b, c), primarily out of said liquid circuit of said middle/outer heat accumulator region (23, 24) and secondarily out of said liquid circuit of said central accumulator region (21),
further comprising an outer air intake channel arranged around a peripheral accumulator region (26) and an inner intake channel running in said solid heat accumulator (21, 23, 24), and a multiway valve for controlling cooled air that can be sucked in through said outer air intake in summer operation, and preheated air that can be sucked in through an inner intake channel in winter operation and be blown into said building.

16. An energy system for buildings, comprising:
(a) solar absorber having first tubes or pipes(7, 8) that are laid between a roof covering and an insulating layer (6) arranged under said roof covering,
(b) said solar absorber being divided into at least two regions, each with its own liquid circuit through said first tubes or pipes (7, 8),
(c) a solid heat accumulator (21, 22, 23, 24, 26) arranged under the building, to which heat can be supplied and from which heat can be withdrawn by second tubes or pipes laid in said solid heat accumulator,
characterized in that
said solid heat accumulator is divided into at least two regions, comprising a central region (21, 22)

and a middle outer (23, B; 24) region, each with its own liquid circuit through said second tubes or pipes of that region, in which in heat accumulation operation, liquid is supplied via first temperature controlled valves (9, 10) from said liquid circuit of each region of said solar absorber primarily to said liquid circuit (21) of said central heat accumulator region and secondarily to said liquid circuit (23, 24) of said middle/outer heat accumulator region, when the temperature of liquid from said liquid circuit of a respective solar absorber region is higher at least by a value in the range of 2–8° C. than the temperature of a respective solid accumulator region (21, 22, 23, 24, 26), and in that in heat extraction operation, liquid is pumped into a heating system (17, 18) of said building through second temperature controlled valves (29a, b, c), primarily out of said liquid circuit of said middle/outer heat accumulator region (23, 24) and secondarily out of said liquid circuit of said central heat accumulator region (21), and in that said solar absorber regions (I, II, III) are brought together on their return side (47, 48, 49) by means of third temperature controlled valves (50, 51, 52) and feed a collector (40) in common; and united return sides (41, 42, 43) of said central solid accumulator region (21, C) and united return sides of said middle/outer solid accumulator region (23, B; 24, A) are supplied in common via a pump (39) to a supply side of said solar absorber (35, 36, 37); and supply sides of said central solid accumulator region (C) and said middle/outer solid accumulator region (A,B) open into said collector (40), via a fourth temperature controlled valve (44, 45, 46) respectively; and a connection (54) is provided via a fifth temperature controlled valve (55) between an inlet of said pump (39) and said collector (40).

* * * * *